United States Patent
Tamisiea (10) Patent No.: US 10,279,486 B2
(45) Date of Patent: May 7, 2019

(54) CONSTRUCTION EQUIPMENT ACCESSORY AND METHODS OF MOVING ELONGATE OBJECTS

(71) Applicant: Tidy Site Services, LLC, Waukee, IA (US)

(72) Inventor: Reid Tamisiea, Waukee, IA (US)

(73) Assignee: TIDY SITE SERVICES, LLC, Waukee, IA (US)

( * ) Notice: Subject to any disclaimer, the term of this patent is extended or adjusted under 35 U.S.C. 154(b) by 0 days.

(21) Appl. No.: 15/647,421

(22) Filed: Jul. 12, 2017

(65) Prior Publication Data
US 2019/0015995 A1    Jan. 17, 2019

(51) Int. Cl.
| | |
|---|---|
| *B25J 15/12* | (2006.01) |
| *B25J 15/02* | (2006.01) |
| *B66C 1/58* | (2006.01) |
| *B66C 1/44* | (2006.01) |

(52) U.S. Cl.
CPC ............ *B25J 15/12* (2013.01); *B25J 15/024* (2013.01); *B66C 1/58* (2013.01); *B66C 1/447* (2013.01)

(58) Field of Classification Search
CPC .......... B25J 15/12; B25J 15/024; B66C 1/58; B66C 1/447
USPC ................. 414/621, 622, 619, 729
See application file for complete search history.

(56) References Cited

U.S. PATENT DOCUMENTS

| | | | |
|---|---|---|---|
| 907,902 A | 12/1908 | Skinner | |
| 2,903,803 A | 9/1959 | Austin, Sr. | |
| 3,797,684 A * | 3/1974 | Brandt | B66F 9/19 414/420 |
| 5,918,923 A | 7/1999 | Killion | |
| 6,098,320 A | 8/2000 | Wass | |
| 6,616,383 B2 | 9/2003 | Janz | |
| 6,655,899 B1 * | 12/2003 | Emerson | B66C 1/585 294/3 |
| 6,932,556 B1 | 8/2005 | Ecker | |
| 7,241,101 B2 | 7/2007 | Bauer et al. | |
| 7,811,028 B1 | 10/2010 | de la Rosa et al. | |

(Continued)

FOREIGN PATENT DOCUMENTS

DE    102012025131 A1    7/2014

OTHER PUBLICATIONS

"The Rancher Series," Anbo Attachments, retrieved online from <http://www.anbomanufacturing.com/rancher-series>, known to be publicly available at least as early as Jul. 2014, 5 pages.

(Continued)

*Primary Examiner* — Kaitlin S Joerger
(74) *Attorney, Agent, or Firm* — Fredrikson & Byron, P.A.

(57) ABSTRACT

A construction equipment accessory can include a construction equipment attachment portion, which can include a mechanical interface, a hydraulic interface, and a center section coupled to the mechanical interface, first and second support arms pivotably coupled to the construction equipment attachment portion's center section, and first and second finger grapples. The first and second finger grapples can each include two or more opposing fingers and can be hydraulically movable between open and closed positions. By attaching the construction equipment accessory to construction equipment with the construction equipment attachment portion, an operator can move elongate objects such as pipes, poles, and erosion control products.

20 Claims, 7 Drawing Sheets

(56) References Cited

U.S. PATENT DOCUMENTS

| | | | |
|---|---|---|---|
| 7,913,431 B1 | 3/2011 | Beam et al. | |
| 8,016,334 B2 * | 9/2011 | Garrett | A01D 87/122 |
| | | | 294/119.1 |
| 8,069,591 B2 | 12/2011 | Dunn | |
| 8,069,592 B2 * | 12/2011 | Ellett | B66C 23/44 |
| | | | 37/406 |
| 8,208,995 B2 | 6/2012 | Tearney et al. | |
| 8,449,241 B2 | 5/2013 | Fritsch | |
| 8,834,090 B1 | 9/2014 | Callens | |
| 2004/0223838 A1 | 11/2004 | Daniel | |
| 2005/0115638 A1 | 6/2005 | Solesbee | |
| 2006/0133897 A1 | 6/2006 | Allard et al. | |
| 2007/0122262 A1 | 5/2007 | Daniel | |
| 2007/0280789 A1 | 12/2007 | Britten | |
| 2009/0269181 A1 * | 10/2009 | Moffitt | B66F 9/18 |
| | | | 414/732 |
| 2011/0148131 A1 | 6/2011 | Holden | |
| 2011/0229275 A1 | 9/2011 | Winings et al. | |
| 2012/0282072 A1 * | 11/2012 | Sheppard | E02F 3/3695 |
| | | | 414/722 |
| 2012/0321382 A1 | 12/2012 | Rosier | |
| 2013/0192098 A1 | 8/2013 | Matsumoto | |
| 2014/0212244 A1 | 7/2014 | Meyer | |
| 2015/0047862 A1 | 2/2015 | Hull | |

OTHER PUBLICATIONS

Various Images of Loading Attachments for Skid Steer Loaders, Retrieved online from < http://www.wikco.com/esptr.html>, known to be publicly available at least as early as Jul. 2014, 5 pages.

"General Purpose Grapples," Anbo Attachments, retrieved online from <http://www.anbomanufacturing.com/general-purpose-grapples>, known to be publicly available at least as early as Jul. 2014, 6 pages.

Rock Bucket Sieve Grapple suit Bobcat [1580 to 2130mm], Retrieved online from <http://www.tradingpost.com.au/Industry/Earthmoving-Machinery-/Rock-Bucket-Sieve-GRAPPLE-suit-Bobcat-1580-to-2130mm/Darra/QLD/AdNumber=AD005589539>, known to be publicly available at least as early as Jul. 2014, 5 pages.

\* cited by examiner

CONSTRUCTION EQUIPMENT ACCESSORY AND METHODS OF MOVING ELONGATE
OBJECTS

BACKGROUND

A piece of construction equipment, like a skid loader, has the potential to be used at a work site to transport smaller equipment and accessories that are too heavy or unwieldy for a single human to maneuver. Using the construction equipment to move these smaller pieces around the work site would save time and maximize the utility of a skid loader or other construction equipment.

A problem arises, however, because some pieces of construction equipment are ill-suited to lifting or carrying objects of all shapes and sizes. A skid loader, for example, features a movable bucket at the front that has ample lifting power but that is not adapted to lifting or carrying objects that do not readily fit into the bucket. Likewise, a forklift, for example, features projecting fork member at the front that have ample lifting power but that may not be adapted to lifting or carrying objects that are not situated on a base (e.g., pallet) adapted to receive the forks.

SUMMARY

In general, this disclosure is directed to apparatuses and methods for moving elongate objects such as pipes, poles, and erosion control products utilizing a general purpose moving machine such as a skid loader, tractor, forklift, or telescopic handler as examples. Such machines, in and of themselves, may not be well suited to moving elongate objects. This disclosure is directed to an accessory that can be attached to, or incorporated into, the general purpose moving machine as well as related methods. The apparatuses and methods described herein can improve the ability of these machines to move elongate objects.

One benefit of the apparatuses and methods described herein, is that the apparatuses and methods allow a person to use a general purpose moving machine to safely and securely move an elongate object into place in what can be a one-man operation. Providing apparatuses and methods that enable elongate objects to be moved around by only one person reduces project costs and also reduces the man hours required to complete the project, thereby helping to reduce overall resource requirements and project costs. In addition, embodiments of the disclosed apparatuses and methods may comply with relevant Occupational Safety and Health Administration (OSHA) for transporting objects.

The details of one or more examples are set forth in the accompanying drawings and the description below. Other features, objects, and advantages will be apparent from the description and drawings, and from the claims.

DETAILED DESCRIPTION

Methods and systems for an apparatus and procedure for moving an elongate object 5 (shown in FIG. 6) using a general purpose moving machine 3 are described. Exemplary embodiments can include both an accessory 1 (shown in FIGS. 2A, 2B, and 5-6) that may be attached to a general purpose moving machine 3 to enable it to move an elongate object 5, a process for handling an elongate object 5 using the accessory 1, and, in some cases, transporting elongate object 5 around a worksite.

Figure 1:
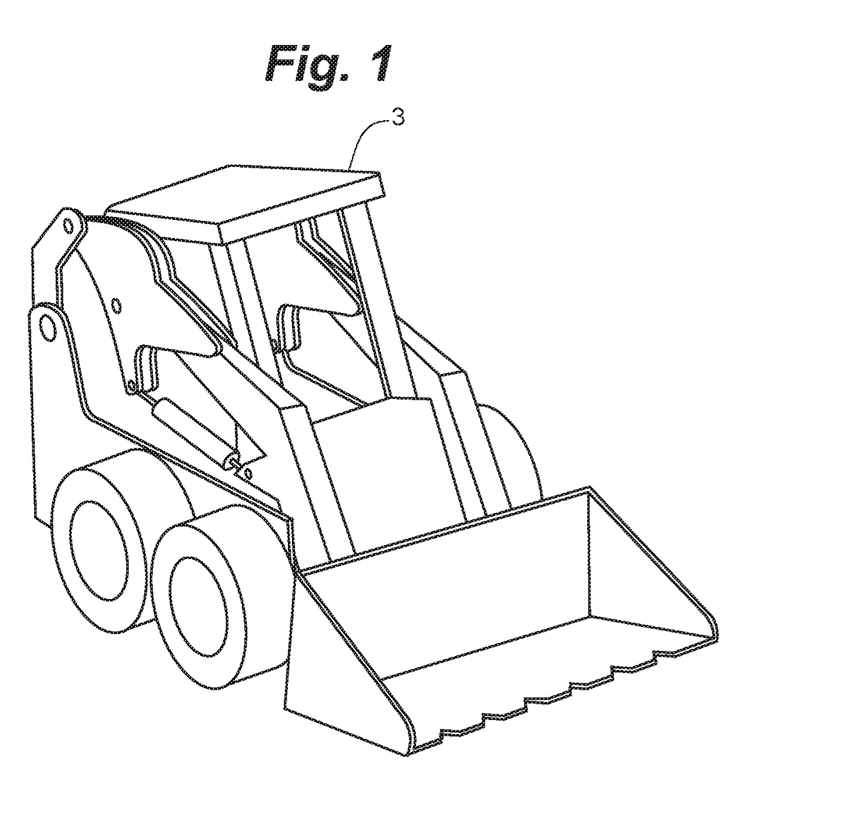
FIG. 1 is a depiction of one example of a general purpose moving machine.

FIG. 1 depicts a general purpose moving machine 3. General purpose moving machine 3 may include skid loaders, excavators, backhoe loaders, tractors, forklifts, and telescopic handlers as examples. Though, it will be understood that a variety of other suitable general purpose moving machines may be within the scope of various embodiments herein. This equipment may be used in projects such as general construction projects or specific purposes like pipe-laying. The method and systems disclosed may be tailored to fit each of these situations and applications. As shown in FIG. 1, the general purpose moving machine 3 includes a bucket attachment coupled to it. The general purpose moving machine 3 can include a universal attachment plate to which the bucket is removably coupled and to which a number of other utility attachments can be removably coupled for specific applications of the general purpose moving machine 3.

Figure 2A:
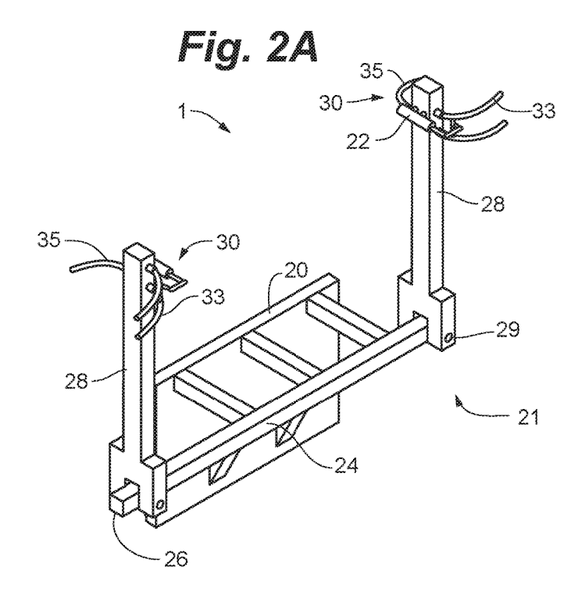
FIG. 2A is a depiction of the accessory in a compact position according to various embodiments, when not attached to a general purpose moving machine.
Figure 2B:
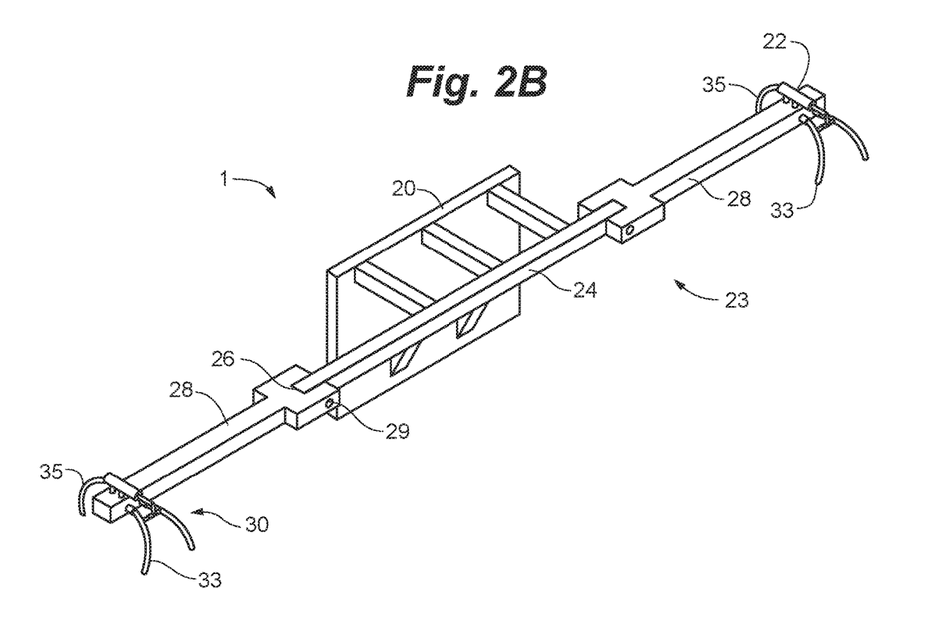
FIG. 2B is a depiction of a construction equipment accessory in the working position according to various embodiments when not attached to a general purpose moving machine.

FIGS. 2A and 2B depict an accessory 1 that can be attached to a general purpose moving machine and thereby can enable the general purpose moving machine to move, for instance, an elongate object. Lifting and transporting capabilities of the general purpose moving machine may be realized, such as by expanding these capabilities to encompass various objects, by attaching the accessory 1. Accessory 1 can enable the general purpose moving machine to pick up and transport certain objects, such as construction materials. In some embodiments, the accessory 1 includes a mechanical interface 20 that can mechanically attach the accessory 1 to the general purpose moving machine. Mechanical interface 20 may attach accessory 1 to a general purpose moving machine at an attachment plate on the general purpose mobbing machine.

For instance, a general purpose moving machine can have a universal attachment plate to which a variety of utility attachments can be removably coupled. For instance, an excavator can have a universal attachment plate to which a bucket and other earth moving utility attachments are removably coupled as needed. Likewise, a skid loader can have a universal attachment plate to which a bucket, drill, and other utility attachments are removably coupled as needed. Thus, a universal attachment plate of a particular moving machine can include a known coupling structure according to which a number of utility attachments are designed so as to be configured to removably couple to the particular moving machine. The mechanical interface 20 of the illustrated exemplary accessory 1 can include a coupling structure corresponding to a universal attachment plate structure of a particular moving machine. The mechanical interface 20 of the accessory 1 can be configured to attach to the coupling structure of the universal attachment plate. In this way, the mechanical interface 20 can attach to the particular moving machine at its universal attachment plate in a same way that other utility attachments for that particular moving machine do.

In some embodiments the attachment plate may include support bars that stabilize and support the weight of accessory 1. According to some embodiments, the accessory 1 includes a hydraulic interface 22 that hydraulically attaches the accessory 1 to the general purpose moving machine. The accessory 1 can include internal fluid lines for distributing hydraulic fluid received at the hydraulic interface 22 therein as needed in operation. In some embodiments the hydraulic interface 22 fluidly connects to the hydraulic system of a general purpose moving machine that would serve to operate a utility attachment to that moving machine (e.g., movable bucket or other attachable hydraulic tool). The mechanical interface 20 and hydraulic interface 22 securely attach the accessory 1 to the general purpose moving machine 3.

As noted, the hydraulic interface 22 may connect to the hydraulic system of general purpose moving machine. Various types of general purpose moving machines, such as skid loaders and compact track loaders, contain a hydraulic system used to drive the machine, operate and power functions and attachments, provide braking, and lubricate components, among other things. Hydraulic system of a general purpose moving machine may include one or more hydraulic pumps. The general purpose moving machine may include valves to allow attachment of accessories to the hydraulic system.

In some embodiments, the hydraulic interface 22 includes one or more hydraulic cylinders. According to some embodiments, the hydraulic interface 22 may connect to general purpose moving machine using one or more hoses engaged with the hydraulic cylinders. According to some embodiments, the hydraulic interface 22 may use hoses to attach to the valves of the hydraulic system of the general purpose moving machine. Such hose at the accessory 1 can be in fluid communication with internal fluid lines of the accessory 1 and thereby distribute the hydraulic fluid received from the hydraulic system of the general purpose moving machine within the accessory 1 as needed for a particular operation. In one example, the hydraulic interface 22 of the accessory 1 can have a hard piped hydraulic connection with the general purpose moving machine.

The accessory 1 may include a center section 24. In many embodiments, the center section 24 is permanently or semi-permanently attached to the mechanical interface 20. In some embodiments, the center section 24 may be removably attached to the mechanical interface 20 for the duration of a project, and may be removed from the general purpose moving machine when a project is completed (e.g., via a tab-and-slot configuration). The center section 24 may have two outside edges 26. The accessory 1 may include two support arms 28. Support arms 28 may be joined to the outside edges 26 on either side of the center section 24 of the accessory 1.

FIG. 2A depicts the accessory 1 in a compact position 21. The support arms 28 can be positioned approximately perpendicularly to the center section 24 when the accessory 1 is in the compact position 21 or in any configuration that minimizes the total width (or otherwise minimize the overall size) of the accessory 1. FIG. 2B depicts the accessory 1 in a working position 23. The support arms 28 can be extended so that they form a generally straight line with the center section 24 to maximize the width of the accessory 1, thereby enabling the accessory 1 to engage an elongate object 5.

Because of the increased width, the accessory 1 can be difficult to transport in traffic outside the worksite when in the working position 23. Placing the accessory 1 in the compact position 21 makes it easier to store in a truck or trailer and to maneuver in traffic. It can be easier to transport the accessory 1 to and from a worksite when in the compact position 21. Accessory 1 may be placed in the compact position 21 by folding the support arms 28. The process of placing the support arms 28 into the compact position 21 may be operable by positioning a pin 29. Placing the support arms 28 into the compact position 21 may also be accomplished by using the hydraulic system of general purpose moving machine 3. When the accessory 1 is at a worksite, it may be expanded into the working position 23 to engage and transport an elongate object 5. Accessory 1 may be attached to the general purpose moving machine 3 during the transition between the compact position 21 and working position 23. Details of how accessory 1 attaches to general purpose moving machine 3 are discussed above.

The illustrated embodiment of the accessory 1 in FIGS. 2A and 2B shows the support arms 28 pivoting (e.g., at pin 29) relative to the center section 24 to move between the compact and working positions 21, 23. As shown here, the support arms 28 can pivot generally ninety degrees relative to the center section 24, though in another embodiment the support arms 28 can pivot one hundred and eighty degrees relative to the center section 24 so as to overlay one another at the center section 24. In an additional embodiment, the support arms 28 can translate relative to the center section 24 to move between the compact and working positions 21, 23 either in addition to, or as an alternative to, having the pivoting capability. In such an embodiment, the supports arms 28 can have a cross-sectional area that is smaller than a cross-sectional area of the center section 24 such that the support arms can take the form of telescoping members into the center section 24. In this case, the support arms 28 may slide within the center section 24 up to the location at which finger grapples 30 are positioned.

Figure 2C:
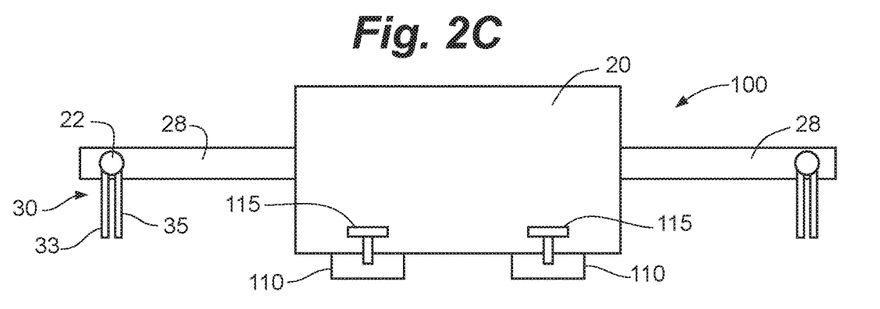
FIG. 2C is a depiction of an alternate embodiment of a construction equipment accessory in the working position when not attached to a general purpose moving machine.
Figure 2D:
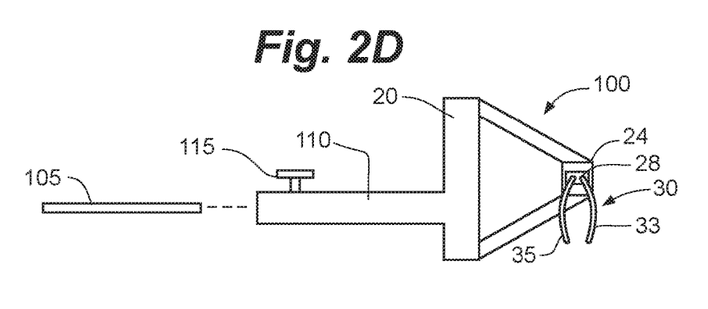
FIG. 2D is a depiction of the alternate embodiment of a construction equipment accessory of FIG. 2C being attached to a general purpose moving machine.

FIGS. 2C and 2D illustrate an exemplary alternate embodiment of a construction equipment accessory 100. In particular, FIG. 2C shows a rear (a side facing the machine) elevational view of the accessory 100 in the working position, when not attached to a general purpose moving machine, while FIG. 2D shows a side elevational view of the accessory 100 being attached to a general purpose moving machine. The accessory 100 similarly includes the mechanical interface 20, hydraulic interface 22, center section 24, support arms 28, and finger grapples 30 positioned on the support arms 28. The support arms 28 of the accessory 100 can move between compact and working positions as described.

The accessory 100 can be the same as the accessory 1 described herein, but with the accessory 100 including different features for removably coupling to a general purpose moving machine. The accessory 100 can be useful, for instance, in cases where the general purpose moving machine does not include a universal attachment plate.

In the illustrated embodiment, the accessory 100 is shown as being coupled to a forklift machine at forks 105. The accessory includes two fork slots 110 configured to receive respective forks 105 of the forklift machine. When the forks 105 are received within the respective fork slots 110, a securing member 115 can be actuated to hold the respective forks 105 in place at the accessory 100. Each fork slot 110 can include a securing member 115 extending within the fork slot 110. Upon actuating, the securing member 115 can be moved within the fork slot 110 and brought into engagement with the received fork 105. In this way, the accessory 100 can be made to couple to a forklift machine and perform the functions described herein.

Figure 3A:
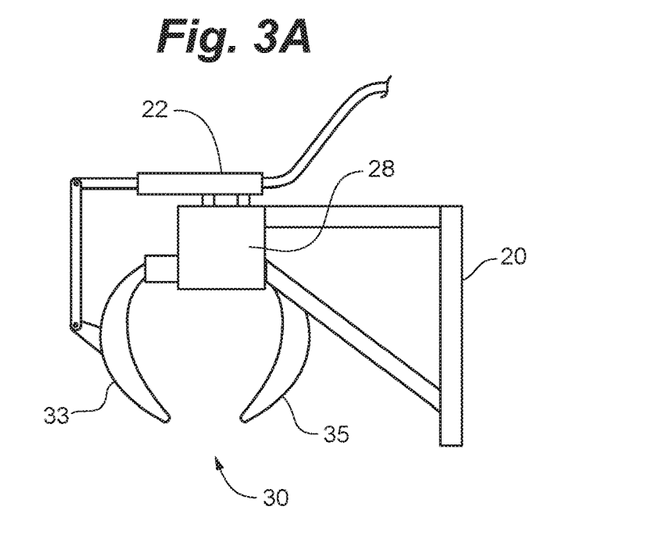
FIG. 3A is a depiction of a front view of finger grapples attached to arms of a construction equipment accessory according to various embodiments.
Figure 3B:
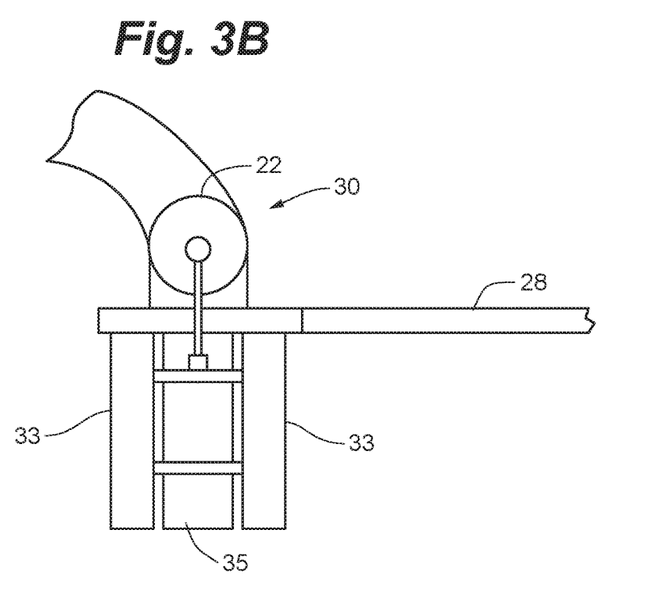
FIG. 3B is a depiction of a side view of finger grapples attached to arms of a construction equipment accessory according to various embodiments.

FIG. 3 depicts finger grapples 30 that may be attached to an accessory described herein. According to some embodiments, the finger grapples 30 attach to each of the support arms 28 such that the accessory can, in one embodiment, have finger grapples 30 at opposite ends in the working position. The finger grapples 30 may be capable of actuating between open and closed positions. The finger grapples 30 may, for instance, operate hydraulically. In some embodiments, the finger grapples 30 include at least two opposing fingers. The finger grapples 30 may include two upper fingers 33 and one lower finger 35. According to some embodiments, the lower finger 35 is stationary, and the upper fingers 33 may be moved hydraulically. In another embodiment, all of the fingers—e.g., the two upper fingers 33 and the one lower finger 35—can be independently actuatable, such as to move between the open and closed positions.

The finger grapples 30 attached to support arms 28 may grasp an elongate object by appropriately positioning the upper fingers 33 and lower finger 35. When lower finger 35 is positioned in contact with elongate object 5, the operator may hydraulically move upper fingers 33 to contact elongate object 5. When both upper fingers 33 and lower finger 35 are in contact with elongate object 5, the pressure applied by finger grapples 30 secures the elongate object at the accessory. Hydraulically operating the finger grapples 30 enables the operator of a general purpose moving machine to save time by utilizing an accessory while also operating a general purpose moving machine.

Figure 4:
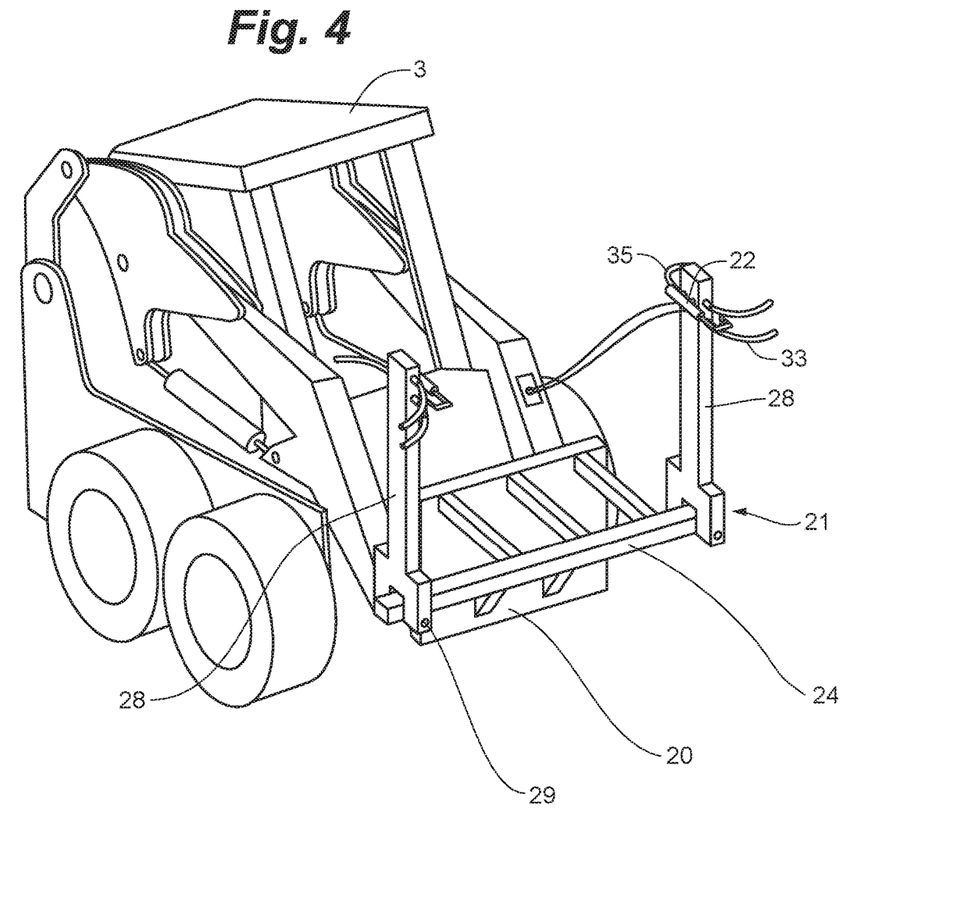
FIG. 4 is a depiction of a construction equipment accessory attached to a general purpose moving machine in the compact position according to various embodiments.
Figure 5:
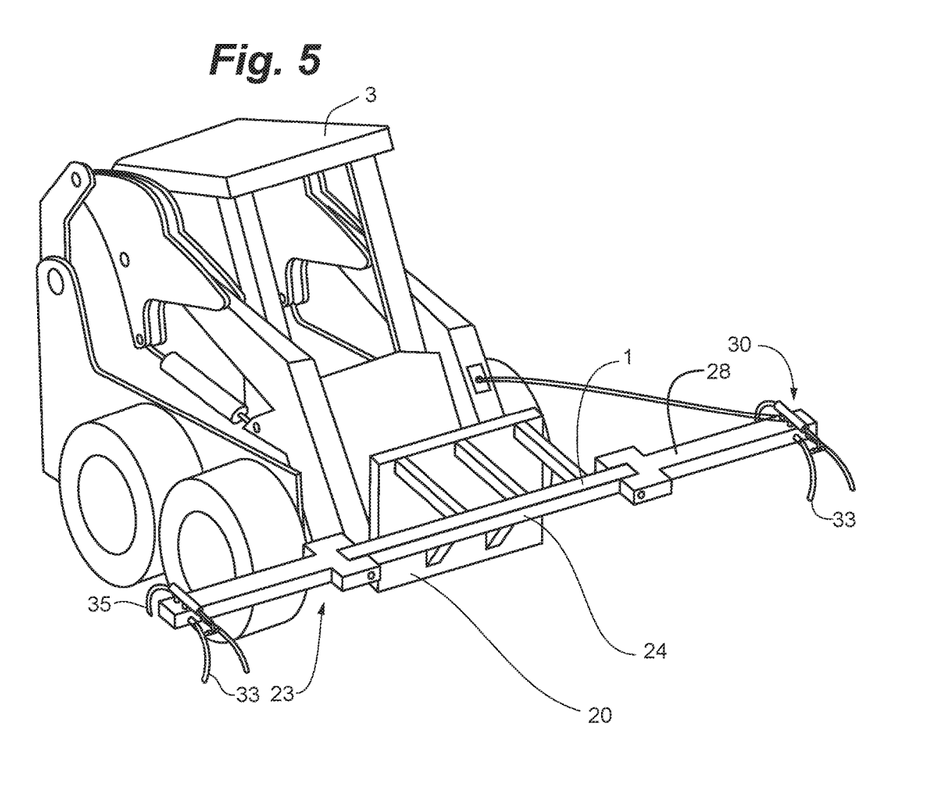
FIG. 5 is a depiction of a construction equipment accessory attached to a general purpose moving machine in the working position according to various embodiments.
Figure 6:
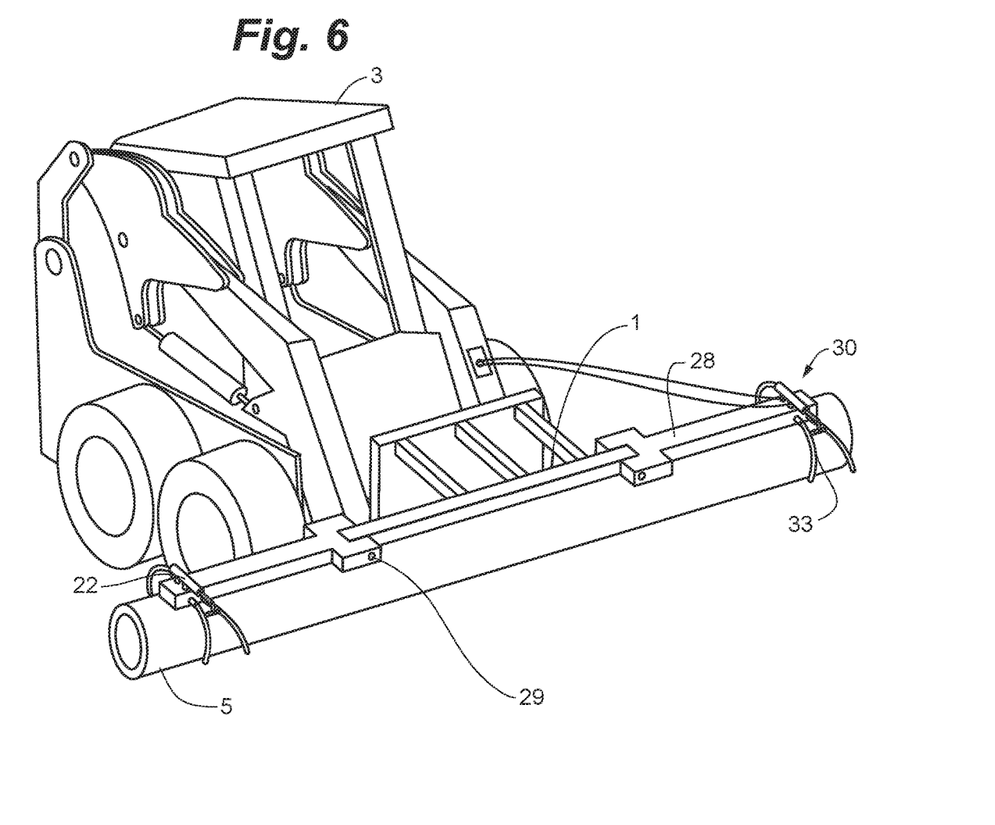
FIG. 6 is a depiction of a general purpose moving machine using a construction equipment accessory to handle an elongate object according to various embodiments.

FIGS. 4-6 depict the process of using accessory 1 to move an elongate object 5. In some embodiments accessory 1 is placed into the compact position 21 and loaded onto a truck. The truck may transport accessory 1 to a worksite. When accessory 1 is at the worksite, it may be mechanically and hydraulically attached to a general purpose moving machine 3. The operator may then move the accessory 1 into the working position. Details of how accessory 1 is attached to general purpose moving machine 3, and how to move accessory 1 into the working position, are discussed above.

With the accessory 1 in the working position 23, the general purpose moving machine 3 may approach an elongate object 5 and position the finger grapples 30 near the elongate object 5. The operator may then use the finger grapples 30 to grasp elongate object 5. Operating a control of the machine 3 can supply hydraulic power to raise the accessory 1 via the mechanical attachment 20 and thereby lift the elongate object 5. Elongate object 5 may then be moved to a desired location and put in place. This may be accomplished by, again, operating a control of the machine 3 to lower accessory 1 via the mechanical attachment 1 and then release the finger grapples 30. This process may be repeated as necessary. For example, if a general purpose moving machine 3 is being used to install pipes, it may excavate a trench. General purpose moving machine 3 may then use accessory 1 to transport all required sections of pipe to the trench and place the sections of pipe into the trench. Similarly, if a general purpose moving machine 3 is being used to complete an erosion control project, it may use accessory 1 to transport and position multiple erosion control barriers.

When a project is completed, accessory 1 may be mechanically and hydraulically removed from general purpose moving machine 3. Accessory 1 may be placed in the compact position 21 before or after removal from general purpose moving machine 3. Details of how accessory 1 is attached to general purpose moving machine 3, and how to move accessory 1 into the compact position, are discussed above. Accessory 1 may be loaded on a truck and transported away from the worksite.

FIG. 4 depicts an accessory 1 in a compact position 21, with the support arms 28 pivoted and positioned vertically. According to some embodiments, when the accessory 1 is attached to a general purpose moving machine 3, the support arms 28 are positioned vertically when in the compact position 21. In some embodiments the support arms 28 may be pivoted manually between the working position 23 and the compact position 21. According to some embodiments, the support arms 28 may be pivoted hydraulically between the compact position 21 and the working position 23.

In some embodiments, the support arms 28 are pivotable between a compact position 21 and a working position 23. FIG. 5 depicts accessory 1 with the support arms 28 placed in a fully horizontal working position 23. According to some embodiments, when the accessory 1 is attached to a general purpose moving machine 3, the support arms 28 are positioned horizontally when in the working position 23. When the support arms 28 are in the working position 23, accessory 1 enables a general purpose moving machine 3 to handle an elongate object 5 that is, for instance, longer than general purpose moving machine 3 could otherwise handle.

One advantage of the pivotable support arms 28 is the adjustable width of the accessory 1. The center section 24 and the support arms 28 of the accessory 1 have defined widths. When the support arms 28 are positioned in the working position 23, the width of accessory 1 can be equal to the full width of the center section 24 and both the support arms 28. But when the support arms 28 are positioned in the compact position 21, the width of the accessory 1 can be roughly equal to the width of the center section 24. This width may be slightly greater than the width of center section 24 depending on the precise placement of the support arms 28, but placing the support arms 28 in this position reduces the overall width of accessory 1. Placing the support arms 28 in the compact position 21 therefore makes it easier for an operator to maneuver a general purpose moving machine 3 while an accessory 1 is attached but not in use. As such it is not necessary to remove the accessory 1 between each use. This also enables a general purpose moving machine 3 to maneuver more than one copy or piece of an elongate object 5 while accessory 1 remains attached.

According to some embodiments, the width of the accessory 1 when the support arms 28 are in the working position 23 is between 18 and 60 feet. In some embodiments, the width of the accessory 1 when the support arms 28 are in the compact position 21 is between 6 and 20 feet.

A system for grasping and releasing an elongate object 5 is also disclosed. The system includes a general purpose moving machine 3 and an accessory 1 for a general purpose moving machine 3. According to some embodiments, an accessory 1 is attached to a general purpose moving machine 3, such as at a remote location. By placing the accessory 1 in the compact position 21, the accessory 1 may be attached to a general purpose moving machine 3 before the general purpose moving machine 3 is transported to a work site. A general purpose moving machine 3 may also be stored at a remote location while accessory 1 remains attached. In this way general purpose moving machine 3 and accessory 1 may remain prepared for transportation to a work site on short notice with no need for additional preparation.

In some embodiments, general purpose moving machine 3 may be a skid loader, excavator, backhoe loader, tractor, forklift, or telescopic handler, as examples. Attaching accessory 1 to general purpose moving machine 3 enables general purpose moving machine 3 to carry out such additional construction-related tasks as manipulating an elongate object 5 and transporting an elongate object 5. This may be particularly useful in certain situations, such as in difficult terrain that a truck may not be able to navigate, or where elongate object 5 is too awkwardly shaped to fit into a standard vehicle.

At a work site the support arms 28 of accessory 1, attached to a general purpose moving machine 3, are pivoted, translated, or otherwise actuated from compact position 21 to working position 23 when the operator is prepared to handle or maneuver an elongate object 5.

With the support arms 28 in the working position 23, the general purpose moving machine 3 engages an elongate object 5. FIG. 6 depicts a general purpose moving machine 3 using an accessory 1 to engage and handle an elongate object 5. The finger grapples 30 attached to support arms 28 may grasp elongate object 5 by correctly positioning the upper fingers 33 and lower finger 45. Upper fingers 33 may then be hydraulically moved to grasp elongate object 5 while lower finger 45 remains in place. The tension created by the pressure applied by upper fingers 33 and lower finger 45 secures the elongate object 5.

According to some embodiments, elongate object 5 may be a rigid tube, a pipe, or a beam. These types of elongate objects may need to be installed belowground. A general purpose moving machine 3, such as a skid loader, excavator, or backhoe loader, may be able to excavate a trench or cavity where a rigid tube, a pipe, or a beam would be installed. But without an accessory 1 a general purpose moving machine would not be equipped to transport and position rigid tubes or pipes to complete such a project. According to some embodiments elongate object 5 may be a flexible geo-textile sock filled with filtering material for preventing soil erosion. A general purpose moving machine 3 may be able to transport soil or other material when performing an erosion control project. But a general purpose moving machine 3 would not be equipped to move geo-textile socks or similar erosion control barriers as necessary to complete an erosion control project without an accessory 1.

A general purpose moving machine 3 which has engaged an elongate object 5 using accessory 1 may transport elongate object 5 to a desired location. Elongate object 5 may be deposited at a desired location by hydraulically moving upper fingers 33 to release elongate object 5 from the grasp of finger grapples 30. After an elongate object 5 has been released in a desired location, a general purpose moving machine 3 may be used to rearrange soil in order to bury or stabilize elongate object 5. Using accessory 1 in this manner enhances the utility and versatility of a general purpose moving machine 3 by enabling general purpose moving machine 3 to transport and maneuver a variety of construction materials that are longer or larger than it could transport otherwise.

Various examples have been described. These and other examples are within the scope of the following claims.

The invention claimed is:

1. A construction equipment accessory for use with a construction equipment to grasp and release an elongate object, comprising:
a construction equipment attachment portion including (i) a mechanical interface adapted to mechanically attach the construction equipment accessory to the construction equipment, (ii) a hydraulic interface adapted to hydraulically couple the construction equipment accessory to the construction equipment, and (iii) a center section coupled to the mechanical interface and having first and second side edges;
first and second support arms coupled to the first and second side edges, respectively, of the construction equipment attachment portion's center section, the first and second support arms being movable between a compact position and a working position; and
first and second finger grapples, the first finger grapple coupled to the first support arm, and the second finger grapple coupled to the second support arm, the first and second finger grapples each including two or more opposing fingers and being hydraulically movable between open and closed positions,
wherein, when the construction equipment accessory is attached to the construction equipment, (i) the construction equipment accessory has a construction equipment accessory width, (ii) the construction equipment attachment portion's center section has a center section width, and (iii) the construction equipment accessory width is roughly equal to the center section width plus the length of the first support arm plus the length of the second support arm when the first and second support arms are in the working position.

2. The construction equipment accessory of claim 1, wherein, when the construction equipment accessory is attached to the construction equipment, the first and second support arms are generally horizontal when in the working position.

3. The construction equipment accessory of claim 2, wherein, when the construction equipment accessory is attached to the construction equipment, the first and second support arms are generally vertical when in the compact position.

4. The construction equipment accessory of claim 1, wherein, (iv) the construction equipment accessory width is roughly equal to the center section width when the first and second support arms are in the compact position.

5. The construction equipment accessory of claim 4, wherein the construction equipment accessory width is between about 6 feet and about 20 feet when the first and second support arms are in the compact position and between about 18 feet and about 60 feet when the first and second support arms are in the working position.

6. The construction equipment accessory of claim 1, wherein the first and second support arms are hydraulically pivotable between the compact position and the working position.

7. The construction equipment accessory of claim 1, wherein each finger grapple has a two upper fingers and a single lower finger, the two upper fingers being hydraulically movable, and the single lower finger being stationary.

8. The construction equipment accessory of claim 1, wherein all or a portion of the first and second support arms are slidable within the center section between the compact position and the working position, and wherein the construction equipment accessory width is roughly equal to the center section width plus the length of the first support arm that extends out from the center section plus the length of the second support arm that extends out from the center section when the first and second support arms are in the working position.

9. A method of handling an elongate object at a work site, comprising:
（a) transporting a construction equipment accessory to the work site in a compact position, the construction equipment accessory including:
(i) a construction equipment attachment portion including (A) a mechanical interface, (B) a hydraulic interface, and (C) a center section coupled to the mechanical interface and having first and second side edges,
(ii) first and second support arms pivotably coupled to the first and second side edges, respectively, of the construction equipment attachment portion's center section, and
(iii) first and second finger grapples, the first finger grapple coupled to the first support arm, and the second finger grapple coupled to the second support arm, the first and second finger grapples each including two or more opposing fingers and being hydraulically movable between open and closed positions;
(b) attaching the construction equipment accessory to a construction equipment via the construction equipment attachment portion, including mechanically attaching the construction equipment attachment portion's mechanical interface to the construction equipment and hydraulically coupling the construction equipment attachment portion's hydraulic interface to the construction equipment;
(c) pivoting the first and second support arms from the compact position to a working position; and
(d) hydraulically moving the first and second finger grapples between the open and closed positions to grasp and handle the elongate object
wherein (i) the construction equipment accessory has a construction equipment accessory width, (ii) the construction equipment attachment portion's center section has a center section width, and (iii) the construction equipment accessory width is roughly equal to the center section width plus the length of the first support arm plus the length of the second support arm when the first and second support arms are in the working position.

10. The method of claim 9, wherein the elongate object comprises a flexible geo-textile sock filled with filtering material for preventing soil erosion.

11. The method of claim 9, wherein the elongate object comprises a rigid tube.

12. The method of claim 9, wherein the first and second support arms are generally vertical when in the compact position and generally horizontal when in the working position.

13. The method of claim 9, wherein (iv) the construction equipment accessory width is roughly equal to the center section width when the first and second support arms are in the compact position.

14. The method of claim 13, wherein the construction equipment accessory width is between about 6 feet and about 20 feet when the first and second support arms are in the compact position and between about 18 feet and about 60 feet when the first and second support arms are in the working position.

15. The method of claim 9, wherein pivoting the first and second support arms from the compact position to the working position comprises manually pivoting the first and second support arms from the compact position to the working position.

16. The method of claim 9, wherein pivoting the first and second support arms from the compact position to the working position comprises hydraulically pivoting the first and second support arms from the compact position to the working position.

17. The method of claim 9, wherein each finger grapple has two hydraulically movable upper fingers and a single stationary lower finger.

18. The method of claim 9, wherein the construction equipment comprises a skid loader.

19. A construction equipment accessory for use with a construction equipment to grasp and release an elongate object, comprising:
a construction equipment attachment portion including (i) a mechanical interface adapted to mechanically attach the construction equipment accessory to the construction equipment, (ii) a hydraulic interface adapted to hydraulically couple the construction equipment accessory to the construction equipment, and (iii) a center section coupled to the mechanical interface and having first and second side edges;
first and second support arms pivotably coupled to the first and second side edges, respectively, of the construction equipment attachment portion's center section, the first and second support arms being pivotable between a compact position and a working position; and
first and second finger grapples, the first finger grapple coupled to the first support arm, and the second finger grapple coupled to the second support arm, the first and second finger grapples each including two or more opposing fingers and being hydraulically movable between open and closed positions,
wherein, when the construction equipment accessory is attached to the construction equipment, the first and second support arms are generally horizontal when in the working position generally vertical when in the compact position.

20. The construction equipment accessory of claim 19, wherein, when the construction equipment accessory is attached to the construction equipment, (i) the construction equipment accessory has a construction equipment accessory width, (ii) the construction equipment attachment portion's center section has a center section width, (iii) the construction equipment accessory width is roughly equal to the center section width when the first and second support arms are in the compact position, and (iv) the construction equipment accessory width is roughly equal to the center section width plus the length of the first support arm plus the length of the second support arm when the first and second support arms are in the working position.

* * * * *